Aug. 15, 1967  E. R. CONLON  3,335,835

TORQUE LIMITING SPRING CLUTCH

Filed May 27, 1965

INVENTOR
EDWARD R. CONLON

BY
Scrivener Parker Scrivener & Clarke
ATTORNEYS

United States Patent Office 3,335,835
Patented Aug. 15, 1967

3,335,835
TORQUE LIMITING SPRING CLUTCH
Edward R. Conlon, Bristol, Conn., assignor to Associated Spring Corporation, Bristol, Conn., a corporation of Connecticut
Filed May 27, 1965, Ser. No. 459,200
3 Claims. (Cl. 192—81)

ABSTRACT OF THE DISCLOSURE

An overload release actuator for a spring clutch of the type in which the ends of a helical spring surround the adjacent ends of drive and driven shafts and transmit rotation to the driven shaft when in tight engagement with both shafts, the actuator being operable to release driving engagement at a pre-determined driven shaft load.

---

This application is a continuation-in-part of my copending application Ser. No. 394,403, filed Sept. 4, 1964, for Spring Clutch.

Brief summary of the invention

This invention relates broadly to power transmitting clutches, and more particularly, to those of the type in which a helical spring is associated in co-axial overlapping relation with the aligned ends of a drive shaft and an output shaft and may be operated to drivingly connect or disconnect the shafts by being moved radially into and out of wrapping and frictional engagement with them.

It has been the principal object of this invention to provide a spring clutch of the described type which may be adjusted to transmit all or any desired part of the torque of the drive shaft to the output shaft, whereby the clutch may be adjusted to slip at any pre-determined driven shaft load.

Figure 1:
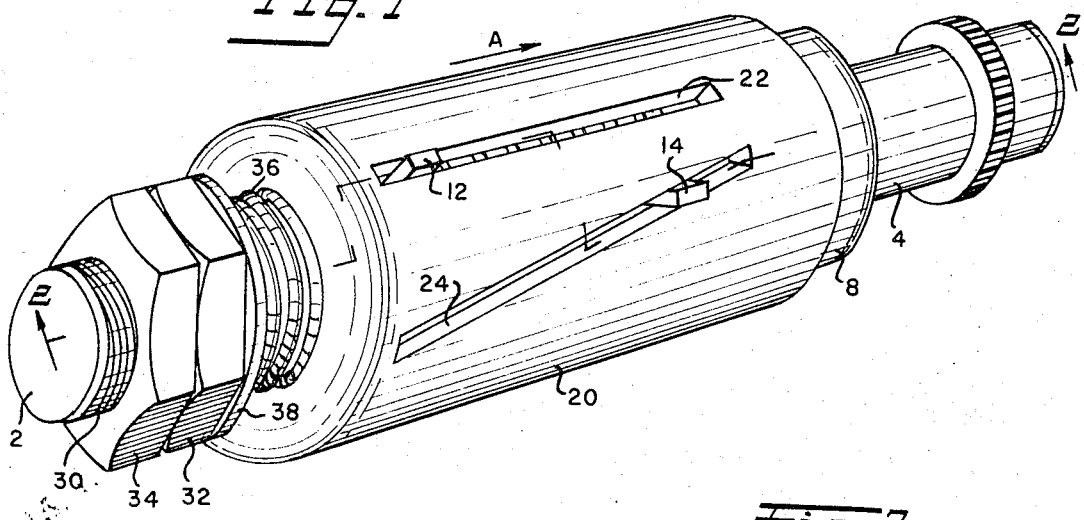
FIG. 1 is a perspective view of a clutch according to the invention.
Figure 2:
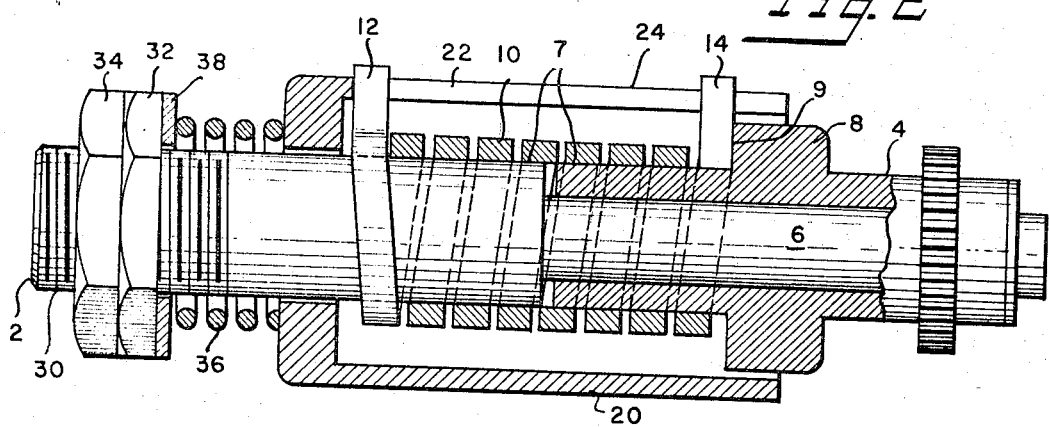
FIG. 2 is a longitudinal sectional view through the clutch illustrated in FIG. 1, taken on line 2—2 of FIG. 1.

A spring clutch embodying the torque limiting means provided by this invention is shown in perspective in FIG. 1 and in cross section in FIG. 2 in operative relation to a drive shaft 2 and an output or driven shaft 4. The shafts are aligned and the drive shaft may have an end part 6 of reduced diameter which is received within an axial bore in the driven shaft to provide a journal for the drive shaft. As shown at 7, the adjacent, aligned end parts of the two shafts have the same outside diameter, and at a point spaced from its end the driven shaft has an enlarged part 8 providing an annular radial surface 9 facing the end of the shaft adjacent the drive shaft.

A helical coil clutch spring 10 surrounds the adjacent end parts of the two shafts and, in the preferred embodiment of the invention, the inside diameter of the spring coil is constant throughout the length of the coil and is such that the coil tends to tightly engage both shafts, so that if left unrestrained it would transmit the full torque of the drive shaft to the driven shaft. Each end of the spring coil is turned radially outwardly for a short distance, forming the tangs 12, 14 and, as most clearly shown in FIG. 1, these tangs are displaced with respect to each other circumferentially of the coil. At its one end the spring bears on the surface 9 provided by the enlarged part 8 of the driven shaft.

Means are provided by the invention for controlling the degree of engagement of the spring coil with the drive and driven shafts, and such means comprise the cylindrical clutch actuating sleeve 20 which surrounds the spring coil and is provided with a first slot 22, which extends axially of the sleeve, and a second slot 24 which extends at an angle to slot 22. The axially extending slot 22 receives and engages tang 12 and the angularly extending slot 24 receives and engages tang 14, and it will be seen that when the actuator sleeve is moved longitudinally over and with respect to the spring coil in the direction of arrow A in FIG. 1 the axial slot 22 will hold tang 12 from rotation with respect to the spring coil and cam slot 24 will force tang 14 circumferentially of the coil in a direction away from tang 12, thus expanding the coil and increasing the inside diameter thereof to relieve the engagement of the clutch spring on the shafts. It will be apparent that radial inward pressure of the spring on the drive and driven shafts, and consequently the torque which the clutch will transmit, is a function of the positions of the tangs with respect to each other circumferentially of the clutch coil and that this, in turn, is a function of the longitudinal position of the actuator sleeve 20.

Means are provided by the invention for adjusting the longitudinal position of the actuator sleeve and for maintaining the sleeve in any desired longitudinal position, thereby to cause the clutch to transmit only a pre-determined torque and to slip at any pre-determined driven shaft load. In the preferred form of the invention illustrated in FIGS. 1 and 2 such means comprise a fine thread 30 on the drive shaft 2 receiving a nut 32 and a lock nut 34, and a compression spring 36 disposed between the end of the actuating sleeve 20 and a washer 38 which surrounds the drive shaft and engages nut 32. It will be seen that by turning nut 32 on the threaded part of the shaft 2 the actuator sleeve may be moved axially of the clutch coil through spring 36 to any desired position, thus adjusting tang 14 circumferentially of the clutch coil with respect to tang 12 and thereby adjusting to any desired value the engagement of the coil on the shafts and the torque which the cluch will transmit. The spring is preferably a low rate compression spring and compensates for slight degrees of wear in the other parts and also permits a more sensitive adjustment of the actuating sleeve. It will be apparent that the reaction of the clutch spring to relative circumferential movement of the tangs will constantly urge the actuating sleeve toward the adjusting nut, thereby maintaining the sleeve in adjusted position. Spring 36 may, of course, be eliminated as it is not necessary to the operation of the clutch, and if this is done the adjusting nut 32 will directly engage the end of actuating member 20. It will be apparent that any operating and adjusting device other than nut 32 may be provided, such for example as a lever, yoke or the like.

If desired, tang 12 and axially extending slot 22 may be eliminated, in which case one end of the clutch spring must be permanently connected to one of the shafts in any suitable way.

Figure 3:
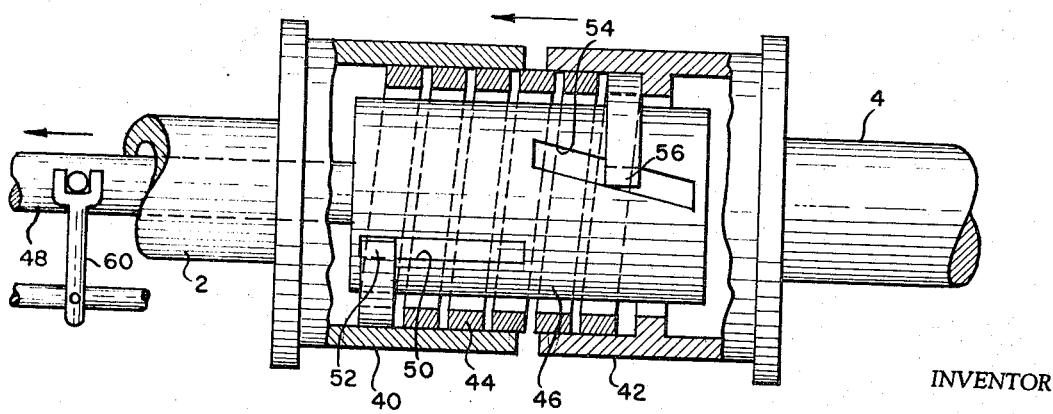
FIG. 3 is a view similar to FIG. 2 showing a second embodiment of the invention.

In a second embodiment of the invention, which is disclosed in FIG. 3 of the drawings, the adjacent ends of the drive and driven shafts 2, 4 have fixed thereto the cylindrical members 40, 42, respectively, which have adjacent, facing open ends. A clutch spring 44 is positioned within the internal chamber formed by these two cylindrical members and has such a diameter that its outer surface normally tightly engages the axially aligned inner surfaces of the two members and thereby normally tends to transmit maximum torque between the two shafts. A cylindrical actuating member 46 is positioned within the spring coil and extends longitudinally thereof and is provided with an operating rod 48 which extends outwardly of the assembly through hollow drive shaft 2. The outer surface of the actuating member has formed therein an axially extending slot 50, which receives a radially inwardly extending tang 52 on one end of clutch spring 44, and a second slot 54 which is angularly related to slot 50 and receives a radially inwardly extending tang 56 on the other end of the spring. The slots are so angularly related to each other that when the actuating rod 48 and sleeve 46 are moved in the direction of the arrow in FIG. 3 the tangs are moved circumferentially with respect to each other to contract the spring coil and reduce the pressure exerted by it on the clutch members 40, 42. As in the other embodiments of the invention, means 60 are provided which are operable to move the operating rod 48 longitudinally to any desired position and maintain it there in order to adjust to any pre-determined value the pressure exerted by the clutch spring on the clutch members 40, 42 to thereby limit the torque which may be transmitted by the clutch and to cause the clutch to slip at any pre-determined driven shaft load.

While I have described and illustrated certain forms which the invention may take, it will be apparent to those skilled in the arts to which it relates that other embodiments, as well as modifications of those disclosed, may be made and practised without departing in any way from the spirit or scope of the invention, for the limits of which reference must be made to the appended claims.

What is claimed is:

1. An overload release actuator in combination with a spring clutch of the type in which the ends of a helical spring engage the adjacent ends of a drive shaft and a driven shaft, and comprising also a sleeve type actuator concentric with the spring which is movable axially of the spring and has angularly related parts comprising an axial slot and a canted slot which receive the ends of the spring whereby axial movement of the actuator moves an end of the spring circumferentially with respect to the other end to release driving engagement between the spring and one of the shafts, means for adjusting the axial position of the actuator with respect to the spring to pre-set the degree of engagement between one end of the spring and its associated shaft, whereby driving engagement between that end of the spring and its associated shaft will be released at a pre-determined torque determined by the degree of engagement.

2. An overload release actuator according to claim 1, in which the ends of the spring surround the ends of the shafts.

3. An overload release actuator according to claim 1, in which the adjacent ends of the shafts have hollow facing parts providing aligned inner peripheral surfaces, and each end of the clutch spring has its outer peripheral surface normally engaging one of the inner peripheral surfaces.

References Cited
UNITED STATES PATENTS 3,230,595   1/1966   Kedem _____ 192—81

FOREIGN PATENTS 151,714   7/1903   Germany.
74,888   7/1932   Sweden.

BENJAMIN W. WYCHE III, *Primary Examiner.*

DAVID J. WILLIAMOWSKY, *Examiner.*